(12) United States Patent
Cui et al.

(10) Patent No.: US 11,407,656 B2
(45) Date of Patent: Aug. 9, 2022

(54) DESALINATION DEVICE WITH GRAPHENE FILTERING FOR THE PRODUCTION OF DRINKING WATER

(71) Applicants: Hong Cui, Shaanxi (CN); Tong Liu, Shaanxi (CN); Yazhou Wang, Shaanxi (CN)

(72) Inventors: Hong Cui, Shaanxi (CN); Tong Liu, Shaanxi (CN); Yazhou Wang, Shaanxi (CN)

(73) Assignee: Shaanxi University of Technology, Shaanxi (CN)

( * ) Notice: Subject to any disclaimer, the term of this patent is extended or adjusted under 35 U.S.C. 154(b) by 42 days.

(21) Appl. No.: 17/037,740

(22) Filed: Sep. 30, 2020

(65) Prior Publication Data

US 2022/0009795 A1 Jan. 13, 2022

(30) Foreign Application Priority Data

Jul. 10, 2020 (CN) .......................... 202010662500.7

(51) Int. Cl.
*C02F 1/14* (2006.01)
*B01D 71/02* (2006.01)
(Continued)

(52) U.S. Cl.
CPC .............. *C02F 1/14* (2013.01); *C02F 1/265* (2013.01); *C02F 1/44* (2013.01); *B01D 71/021* (2013.01); *C02F 2103/08* (2013.01)

(58) Field of Classification Search
USPC .............. 203/10, DIG. 17, 86; 202/182–184, 202/185.1, 270; 159/28.1, 46; 210/348
See application file for complete search history.

(56) References Cited

U.S. PATENT DOCUMENTS 10,092,882 B2 * 10/2018 Yu ........................ B01D 71/024
2018/0147542 A1 * 5/2018 Jhon ...................... C01B 32/194
(Continued)

FOREIGN PATENT DOCUMENTS

CN 111003752 A * 4/2020 ............. B01D 69/02

OTHER PUBLICATIONS

English Machine Translation IP.com, CN 111003752, "Graphene structure for Improving Seawater Desalination Treatment Efficiency based on enhanced heat exchange effect." (Year: 2020).*

*Primary Examiner* — Nina Bhat

(57) ABSTRACT

The invention relates to an anti-blocking seawater desalination device based on graphene filtering, comprising heating device, solar heat-collecting device, fresh water condensation heat-exchange device and thermal-expansion and cold-shrinkage control valve mechanism; the heating device can fully heat and distill seawater, the sprayed seawater is distilled by graphene heat-conduction layers to improve the distillation efficiency and avoiding blocking; the distilled water vapor enters into fresh water condensation heat-exchange device to exchange heat with seawater, increasing the seawater temperature, making full use of the heat in water vapor, and increasing water vapor condensation speed; the distilled concentrated seawater enters into the thermal-expansion and cold-shrinkage control valve mechanism, the flow of seawater entering into the heating device is controlled by the concentrated seawater temperature, when the temperature is too high, the flow of the seawater entering into the heating device increases, and when the temperature is too low, the flow decreases.

8 Claims, 3 Drawing Sheets

(51) Int. Cl.
  *C02F 1/26* (2006.01)
  *C02F 1/44* (2006.01)
  *C02F 103/08* (2006.01)

(56) References Cited

U.S. PATENT DOCUMENTS

| | | | | |
|---|---|---|---|---|
| 2018/0171604 | A1* | 6/2018 | Kim | B01D 5/0003 |
| 2019/0106335 | A1* | 4/2019 | Zhu | C02F 1/048 |
| 2020/0101420 | A1* | 4/2020 | Jang | C02F 1/14 |
| 2020/0261858 | A1* | 8/2020 | Seo | C23C 16/26 |
| 2020/0360868 | A1* | 11/2020 | Macleod | D21H 13/50 |
| 2021/0253431 | A1* | 8/2021 | Bo | B01D 5/0066 |

* cited by examiner

DESALINATION DEVICE WITH GRAPHENE FILTERING FOR THE PRODUCTION OF DRINKING WATER

BACKGROUND OF THE INVENTION

1. Field of the Invention

The invention relates to the technical field of seawater desalination device, in particular to an anti-blocking seawater desalination device based on graphene filtering.

2. Description of the Related Art

Seawater desalination is the use of desalting seawater to produce fresh water. The seawater desalination is an open source incremental technology that realizes the utilization of water resources, and can increase the total amount of fresh water and is not affected by time, space and climate, in addition, the water quality is good and the price is gradually reasonable, which can guarantee the stable water supply such as drinking water for coastal residents and industrial boiler water supply. The process of obtaining fresh water from seawater is called desalination.

At present, the global daily output of seawater desalination is about 35 million cubic meters, of which 80% is used for drinking water, solving the water supply problem of more than 100 million people, that is, 1/50 of the world's population depends on seawater desalination to provide drinking water. There are more than 13,000 desalination plants in the world, and as an alternative and incremental technology for freshwater resources, seawater desalination is increasingly valued by many coastal countries in the world; about 600 billion cubic meters of seawater is directly used as industrial cooling water every year in the world, which saves a large amount of precious freshwater resources; the world extracts 50 million tons of salt, more than 2.6 million tons of magnesium and magnesium oxide, and 200 thousand tons of bromine from the ocean every year.

The main method used in the seawater desalination in the prior art is the distillation method, when the distillation is performed, the seawater is directly passed into the heating device for heating, the heated water vapor is cooled to form fresh water for collection, and the concentrated seawater after the distillation and heating is collected, the prior heating device cannot fully heat and evaporate the seawater that needs to be desalinated, resulting in low desalination efficiency, moreover, the distilled water and concentrated seawater heated by the heating device contain a large amount of heat which is directly discharged, causing energy loss.

SUMMARY OF THE INVENTION

In order to overcome the above-mentioned disadvantages of the prior art, the purpose of the invention is to provide an anti-blocking seawater desalination device based on graphene filtering, which can fully distill and desalinate seawater, heat exchange is performed between the distilled water vapor and the to-be-distilled seawater to increase the heat when the water vapor is cooled, the heat in the distilled concentrated seawater is used to control the flow rate of seawater entering into the heating device, which improves the utilization rate of heat after distillation.

In order to achieve above objects, the invention adopts the following technical schemes, an anti-blocking seawater desalination device based on graphene filtering, comprising heating device, solar heat-collecting device, fresh water condensation heat-exchange device and thermal-expansion and cold-shrinkage control valve mechanism;

heat-conduction fluid outlet on the solar heat-collecting device and heating inlet on the heating device are connected through heat-conduction fluid introduction pipeline, heat-conduction fluid inlet on the solar heat-collecting device and heating outlet are connected through heat-conduction fluid discharge pipeline;

the top of the heating device and fresh water inlet on the fresh water condensation heat-exchange device are connected through a vapor connection pipeline, and fresh water outlet on the fresh water condensation heat-exchange device and fresh water collecting tank are connected through a fresh water collecting pipeline;

seawater inlet on upper end of the fresh water condensation heat-exchange device is connected to a seawater introduction pipeline, seawater outlet on lower end of the fresh water condensation heat-exchange device is connected to the thermal-expansion and cold-shrinkage control valve mechanism through a seawater control pipeline, and the thermal-expansion and cold-shrinkage control valve mechanism and the heating device are connected through seawater adding pipeline;

the heating device and the thermal-expansion and cold-shrinkage control valve mechanism are connected through concentrated seawater discharge pipeline, after passing through the thermal-expansion and cold-shrinkage control valve mechanism, the concentrated seawater enters into a concentrated seawater collecting tank through concentrated seawater collecting pipeline;

water vapor heated by the heating device enters into the fresh water condensation heat-exchange device to exchange heat with the seawater entering into the fresh water condensation heat-exchange device, the water vapor after heat exchange forms fresh water and enters into the fresh water collecting tank (5), the seawater after heat exchange enters the heating device through the thermal-expansion and cold-shrinkage control valve mechanism for heat treatment;

concentrated seawater produced by the heating device enters into the concentrated seawater collecting tank through the thermal-expansion and cold-shrinkage control valve mechanism, when the concentrated seawater enters into the thermal-expansion and cold-shrinkage control valve mechanism, and when the temperature of the concentrated seawater in the heating device increases, the opening and closing of the thermal-expansion and cold-shrinkage control valve mechanism increases, and the flow of seawater entering into the heating device increases, when the temperature of the concentrated seawater in the heating device decreases, the opening and closing of the thermal-expansion and cold-shrinkage control valve mechanism decreases and the flow of seawater entering into the heating device decreases.

The thermal-expansion and cold-shrinkage control valve mechanism comprises a valve body, a fluid outlet arranged on one side of the valve body and connected to the seawater adding pipeline, the valve body is provided with an inner sleeve slidably connected to inner wall of the valve body, and an internal outlet connected to the fluid outlet is provided on side wall of the inner sleeve;

an expansion balloon is arranged on bottom of the valve body, thermal-expansion and cold-shrinkage liquid is provided in the expansion balloon, a heat-conduction pipeline is provided in the thermal-expansion and cold-shrinkage liquid, one end of the heat-conduction pipeline is connected to the concentrated seawater discharge pipeline, the other end thereof is connected to the concentrated seawater collecting pipeline; upper end of the expansion balloon is fixedly connected to bottom of the inner sleeve, and lower end of the expansion balloon is fixedly connected to bottom of the valve body;

when the temperature of the concentrated seawater after passing through the heating device is too high, the concentrated seawater enters into the heat-conduction pipeline through the concentrated seawater discharge pipeline to heat the thermal-expansion and cold-shrinkage liquid in the expansion balloon, after the thermal-expansion and cold-shrinkage liquid in the expansion balloon is heated, the expansion balloon expands and drives the inner sleeve to move up in the valve body, the overlapping area of the internal outlet on the inner sleeve and the fluid outlet on the valve body increases, the opening and closing of the fluid outlet on the valve body increases, and the flow of seawater entering into the heating device increases;

when the temperature of the concentrated seawater after passing through the heating device is too low, the temperature of the thermal-expansion and cold-shrinkage liquid in the expansion balloon becomes lower, and the thermal-expansion and cold-shrinkage liquid shrinks, the volume of the expansion balloon decreases, and the inner sleeve moves downward, the overlapping area of the internal outlet on the inner sleeve and the fluid outlet on the valve body decreases, the opening and closing of the fluid outlet on the valve body decreases, and the flow of seawater entering into the heating device decreases.

The solar heat-collecting device comprises a heat collection support, one end of the heat collection support is provided with an inclined convex lens, and the heat collection support is provided with an inclined heat collection plate, a heat-conduction fluid chamber is formed between the heat collection plate and the heat collection support, and the heat-conduction fluid outlet and the heat-conduction fluid inlet are connected to the heat-conduction fluid chamber.

The heating device comprises heating box and multiple graphene heat-conduction layers arranged in the middle of the heating box, multiple heating pipelines are arranged between the multiple graphene heat-conduction layers, one end of the heating pipelines is connected to the heating inlet, and the other end is connected to the heating outlet, the top of the heating box is provided with a spraying pipeline, multiple spraying heads are provided on the spraying pipeline, the spraying pipeline is connected to the seawater adding pipeline through a seawater inlet pipeline.

The top of the heating box is provided with a curved vapor collecting plate, the top of the curved vapor collecting plate is provided with a vapor outlet pipeline connected to the vapor connection pipeline.

The fresh water condensation heat-exchange device comprises heat-exchange box, heat-exchange filter screen is arranged in the heat-exchange box, and multiple heat-exchange conduits are inserted into the heat-exchange filter screen, upper and lower ends of the multiple heat-exchange conduits are respectively connected to upper distribution annular pipeline and lower distribution annular pipeline of the heat-exchange box, the upper distribution annular pipeline is connected to the fresh water inlet, and lower distribution annular pipeline is connected to the fresh water outlet;

the seawater inlet and the seawater outlet are respectively connected to the inside of the heat-exchange box.

The bottom of the valve body is provided with a support plate, two sides of the support plate are provided with sliding blocks, the sliding blocks provided on both sides are movably connected to sliding paths provided on both sides of the valve body, the support plate and the bottom of the inner sleeve are fixedly connected by a connecting rod, and the top of the expansion balloon and the support plate are fixedly connected.

The center line of the inclined convex lens is parallel to the heat collection plate.

The advantageous effects of the invention: the heating device can fully heat and distill the distilled seawater, when heating, the to-be-heated seawater is sprayed through the spraying heads, and the sprayed seawater is distilled by the graphene heat-conduction layers to improve the efficiency of the distillation, the graphene heat-conduction layers can separate seawater while heating, further speeding up the efficiency of distillation and avoiding blocking; the distilled water vapor enters into the fresh water condensation heat-exchange device to exchange heat with the incoming seawater, increasing the temperature of the seawater, making full use of the heat in the water vapor, and simultaneously increasing the speed of water vapor condensation; the distilled concentrated seawater enters into the thermal-expansion and cold-shrinkage control valve mechanism, and the flow of seawater entering into the heating device is controlled according to the temperature of the concentrated seawater, when the temperature is too high, the flow of the seawater entering into the heating device increases, and when the temperature is too low, the flow of the seawater entering into the heating device decreases, the flow rate of the seawater entering into the heating device is controlled by the temperature, which improves the efficiency of distillation.

DETAILED DESCRIPTION OF THE PREFERRED EMBODIMENTS

Figure 1:
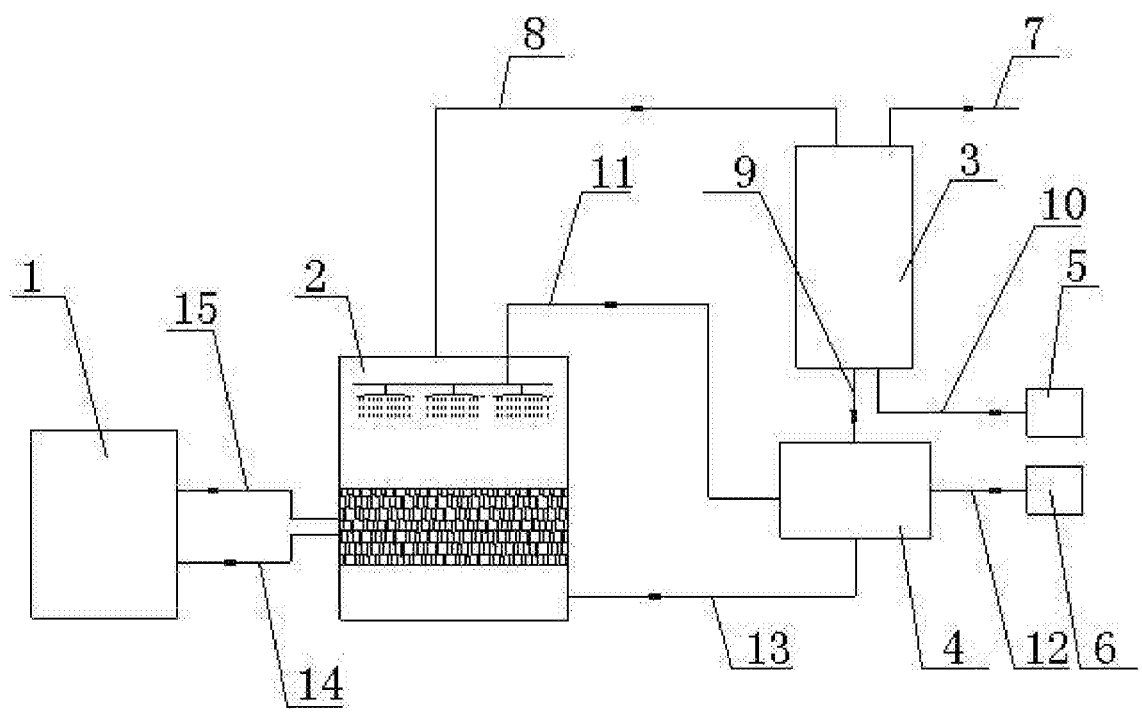
FIG. 1 shows the structure of the invention.

The invention will be described in detail below with reference to the drawings and embodiments.

It should be understood that, in the description of the invention, the orientations or positional relationships indicated by the terms "center", "upper", "lower", "front", "rear", "left", "right", "vertical", "horizontal", "top", "bottom", "inside", "outside" etc., are based on the orientations or positional relationships shown in the drawings, and are only for the convenience of describing the invention and simplifying the description, and does not indicate or imply that the device or element referred to must have a specific orientation, structure and operation, therefore, the terms cannot be understood as a limitation to the invention.

Moreover, the terms "first" and "second" are used for descriptive purposes, and cannot be understood as indicating or implying relative importance or implicitly indicating the number of technical features indicated. Therefore, the features defined by "first" and "second" may explicitly or implicitly include one or more of the features; in the description of the invention, the meaning of "multiple" is two or more, unless specifically defined otherwise.

Embodiment 1

As shown in FIG. 1, an anti-blocking seawater desalination device based on graphene filtering, comprising heating device 2, solar heat-collecting device 1, fresh water condensation heat-exchange device 3 and thermal-expansion and cold-shrinkage control valve mechanism 4;

heat-conduction fluid outlet 106 on the solar heat-collecting device 1 and heating inlet 209 on the heating device 2 are connected through heat-conduction fluid introduction pipeline 14, heat-conduction fluid inlet 105 on the solar heat-collecting device 1 and heating outlet 210 are connected through heat-conduction fluid discharge pipeline 15; the solar heat-collecting device 1 can heat the heat-conduction fluid, the heated heat-conduction fluid enters into the heating device 2 through the heat-conduction fluid introduction pipeline 14 to provide a heat source for the heating device, simultaneously, the heat-conduction fluid after heating (the temperature thereof is reduced after heat exchange) re-enters into the solar heat-collecting device 1 for heating; through circulating heating and heat exchange, the heat efficiency in the heating device 2 is improved.

Figure 5:
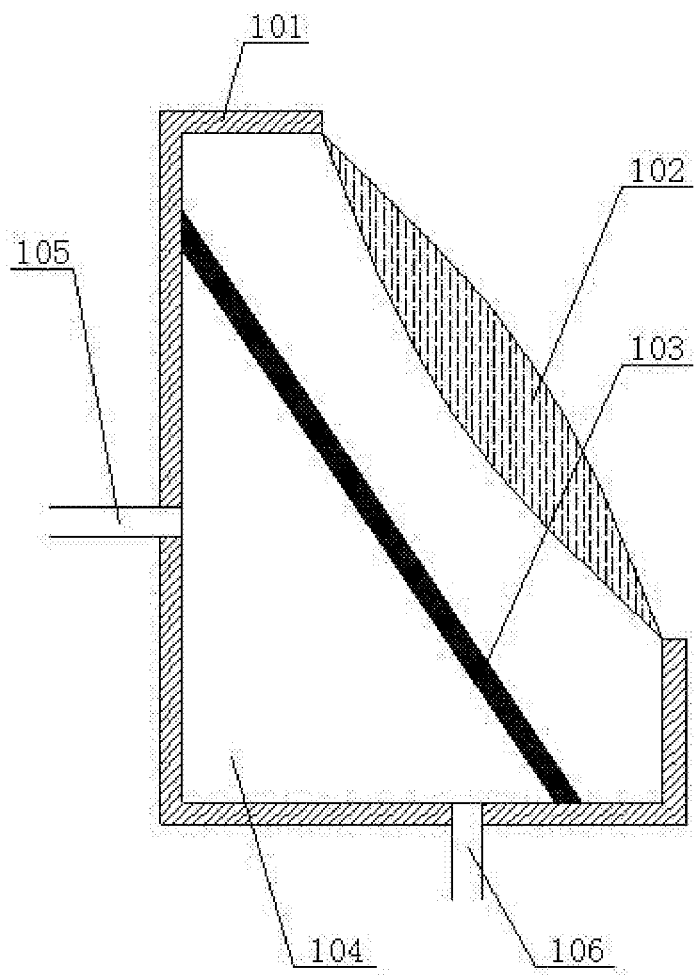
FIG. 5 shows the structure of solar heat-collecting device in the invention.

As shown in FIG. 5, the solar heat-collecting device 1 comprises a heat collection support 101, one end of the heat collection support 101 is provided with an inclined convex lens 102, and the heat collection support 101 is provided with an inclined heat collection plate 103, a heat-conduction fluid chamber 104 is formed between the heat collection plate 103 and the heat collection support 101, and the heat-conduction fluid outlet 106 and the heat-conduction fluid inlet 105 are connected to the heat-conduction fluid chamber. The sunlight is received by the provided inclined convex lens 102, and then irradiated on the heat collection plate 103 after collecting to heat the heat collection plate 103, the heat-conduction fluid in the heat-conduction fluid chamber 104 is heated by the heat collection plate 103 after heating, and the heated heat-conduction fluid enters into the heating device 2 through the heat-conduction fluid outlet 106 for heating, and the heat-conduction fluid after heating and heat exchange enters into the heat-conduction fluid chamber 104 through the heat-conduction fluid inlet for re-heating, in order to ensure that the inclined convex lens 102 can sufficiently heat the heat collection plate 103, the inclination angle of the inclined convex lens 102 is 60°, and the center line of the inclined convex lens 102 is parallel to the heat collection plate 103.

The top of the heating device 2 and fresh water inlet 305 on the fresh water condensation heat-exchange device 3 are connected through a vapor connection pipeline 8, and fresh water outlet 308 on the fresh water condensation heat-exchange device 3 and fresh water collecting tank 5 are connected through a fresh water collecting pipeline 10; the heat-conduction fluid entering into the heating device 2 exchanges heat with the incoming seawater, and the seawater is heated during the heat exchange, the heated seawater forms water vapor, and the formed water vapor enters into the fresh water condensation heat-exchange device 3 through the vapor connection pipeline 8 for cooling, the distilled concentrated seawater enters into the thermal-expansion and cold-shrinkage control valve mechanism 4 through the concentrated seawater collecting pipeline 12;

the to-be-desalinated seawater enters into the fresh water condensation heat-exchange device 3 through the seawater introduction pipeline 7 and the seawater inlet 303 on upper end of the fresh water condensation heat-exchange device 3 to exchange heat with the incoming water vapor, the water vapor after heat change forms fresh water, and the fresh water is discharged through the fresh water outlet 308 and is collected in the fresh water collecting tank 5 through the fresh water collecting pipeline 10, the seawater after heat exchange and heating is discharged through the seawater outlet 309, and enters into the thermal-expansion and cold-shrinkage control valve mechanism 4 through the seawater control pipeline 9;

the thermal-expansion and cold-shrinkage control valve mechanism 4 controls the flow of the seawater entering into the heating device 2 by the principle of thermal-expansion and cold-shrinkage, in particular, when the temperature applied on the thermal-expansion and cold-shrinkage control valve mechanism 4 is too high, the flow of the seawater entering into the heating device 2 increases, when the temperature is too low, the flow of the seawater entering into the heating device 2 decreases;

specifically, the seawater controlled by the thermal-expansion and cold-shrinkage control valve mechanism 4 enters into the heating device 2 through the seawater adding pipeline 11;

the heating device 2 and the thermal-expansion and cold-shrinkage control valve mechanism 4 are connected through concentrated seawater discharge pipeline 13, after passing through the thermal-expansion and cold-shrinkage control valve mechanism 4, concentrated seawater enters into a concentrated seawater collecting tank 6 through concentrated seawater collecting pipeline 12; the temperature of the concentrated seawater after passing through the heating device 2 can reflect the temperature of the distillation in the heating device 2, when the temperature of the concentrated seawater is too high, that is, the temperature in the heating device 2 is too high, the opening and closing of the thermal-expansion and cold-shrinkage control valve mechanism 4 increases, and the flow of seawater entering into the heating device 2 increases, when the temperature in the heating device 2 is too low, the opening and closing of the thermal-expansion and cold-shrinkage control valve mechanism 4 decreases and the flow of seawater entering into the heating device 2 decreases, thereby ensuring that the efficiency of the seawater for heating and distillation in the heating device 2 is in a stable state, and there is no heat waste due to higher temperature and low distillation efficiency due to lower temperature when in the same flow rate.

Specifically, water vapor heated by the heating device 2 enters into the fresh water condensation heat-exchange device 3 to exchange heat with the seawater entering into the fresh water condensation heat-exchange device 3, the water vapor after heat exchange forms fresh water and enters into the fresh water collecting tank 5, the seawater after heat exchange enters the heating device 2 through the thermal-expansion and cold-shrinkage control valve mechanism 4 for heat treatment;

the concentrated seawater produced by the heating device 2 enters into the thermal-expansion and cold-shrinkage control valve mechanism 4 and controls the flow of seawater entering into the heating device 2, when the temperature of the concentrated seawater in the heating device 2 increases, the opening and closing of the thermal-expansion and cold-shrinkage control valve mechanism 4 increases, and the flow of the seawater entering into the heating device 2 increases, when the temperature of the concentrated seawater in the heating device 2 decreases, the opening and closing of the thermal-expansion and cold-shrinkage control valve mechanism 4 decreases and the flow of seawater entering into the heating device 2 decreases.

Embodiment 2

Figure 4:
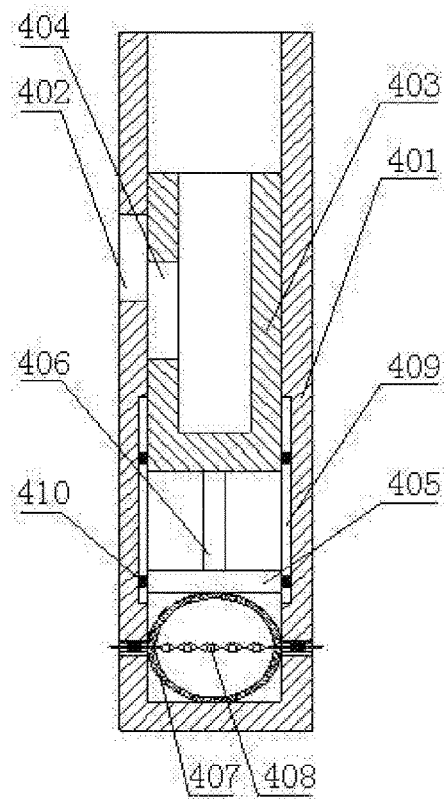
FIG. 4 shows the structure of thermal-expansion and cold-shrinkage control valve mechanism in the invention.

On the basis of embodiment 1, in order to ensure that the thermal-expansion and cold-shrinkage control valve mechanism 4 can control the flow of seawater entering into the heating device 2 through the temperature of the incoming concentrated seawater, thereby the seawater entering into the heating device 2 can be sufficiently distilled without heat waste or poor distillation effect; as shown in FIG. 4, the thermal-expansion and cold-shrinkage control valve mechanism 4 comprises a valve body 401, a fluid outlet 402 arranged on one side of the valve body 401 and connected to the seawater adding pipeline 11, the valve body 401 is provided with an inner sleeve 403 slidably connected to inner wall of the valve body 401, and an internal outlet 404 connected to the fluid outlet 402 is provided on side wall of the inner sleeve 403; when the seawater after heat exchange through the fresh water condensation heat-exchange device 3 enters into the valve body 401 and enters into the 403, the inner sleeve and the valve body slide up and down to change the overlapping area of the the fluid outlet and the internal outlet, when the inner sleeve moves up, the overlapping area of the internal outlet and the fluid outlet increases, the flow of seawater entering into the heating device through the internal outlet and the fluid outlet increases, when the inner sleeve moves downward, the overlapping area of the internal outlet and the fluid outlet on the valve body decreases, the flow of seawater entering into the heating device decreases;

by adopting the following technical scheme to control the inner sleeve move up and down: an expansion balloon 407 is arranged on bottom of the valve body 401, thermal-expansion and cold-shrinkage liquid is provided in the expansion balloon 407, a heat-conduction pipeline 408 is provided in the thermal-expansion and cold-shrinkage liquid, one end of the heat-conduction pipeline 408 is connected to the concentrated seawater discharge pipeline 13, the other end thereof is connected to the concentrated seawater collecting pipeline 12; upper end of the expansion balloon 407 is fixedly connected to bottom of the inner sleeve 403, and lower end of the expansion balloon 407 is fixedly connected to bottom of the valve body 401;

the expansion balloon 407 is made of a rubber material with high temperature resistance and corrosion resistance, and the rubber material has better elasticity, the thermal-expansion and cold-shrinkage liquid in the expansion balloon 407 adopts kerosene, which can ensure a greater effect of thermal-expansion and cold-shrinkage, the thermal-expansion and cold-shrinkage liquid is heated by the heat-conduction pipeline 408 through the heat in the concentrated seawater to change the volume of the expansion balloon 407, thereby changing the positions of the inner sleeve up and down, adjusting the overlapping area of the internal outlet and the fluid outlet, and changing the flow of the seawater entering into the heating device;

when the expansion balloon 407 pushes the inner sleeve to move, the bottom of the valve body 401 is provided with a support plate 405, two sides of the support plate 405 are provided with sliding blocks 410, the sliding blocks 410 provided on both sides are movably connected to sliding paths 409 provided on both sides of the valve body 401, the support plate 405 and the bottom of the inner sleeve 403 are fixedly connected by a connecting rod 406, and the top of the expansion balloon 407 and the support plate 405 are fixedly connected. When the volume of the expansion balloon changes, the support plate 405 is driven to move up and down along the groove, thereby pushing the inner sleeve to move up and down, changing the relative position of the internal outlet, and adjusting the overlapping area of the liquid outlet and the internal outlet;

specifically, when the opening and closing of the thermal-expansion and cold-shrinkage control valve mechanism 4 is adjusted by the temperature of the concentrated seawater after passing through the heating device, and when the temperature of the concentrated seawater after passing through the heating device 2 is too high, the concentrated seawater enters into the heat-conduction pipeline 408 through the concentrated seawater discharge pipeline 13 to heat the thermal-expansion and cold-shrinkage liquid in the expansion balloon 407, after the thermal-expansion and cold-shrinkage liquid in the expansion balloon 407 is heated, the expansion balloon 407 expands and drives the inner sleeve 403 to move up in the valve body 401, the overlapping area of the internal outlet 404 on the inner sleeve 403 and the fluid outlet 402 on the valve body 401 increases, the opening and closing of the fluid outlet 402 on the valve body 401 increases, and the flow of seawater entering into the heating device 2 increases;

when the temperature of the concentrated seawater after passing through the heating device 2 is too low, the temperature of the thermal-expansion and cold-shrinkage liquid in the expansion balloon 407 becomes lower, and the thermal-expansion and cold-shrinkage liquid shrinks, the volume of the expansion balloon 407 decreases, and the inner sleeve 403 moves downward, the overlapping area of the internal outlet 404 on the inner sleeve 403 and the fluid outlet 402 on the valve body 401 decreases, the opening and closing of the fluid outlet 402 on the valve body 401 decreases, and the flow of seawater entering into the heating device 2 decreases.

Embodiment 3

Figure 2:
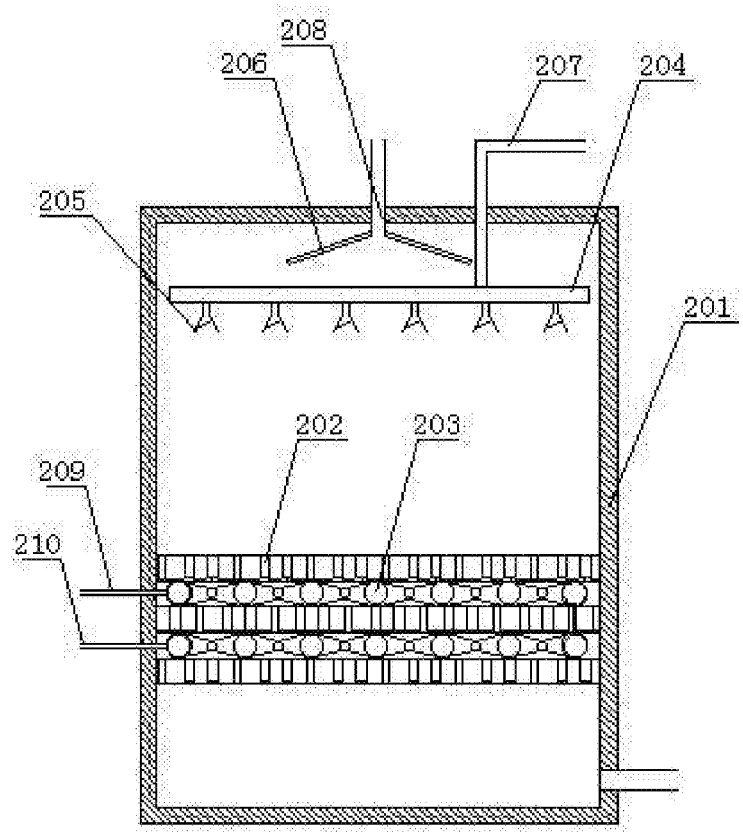
FIG. 2 shows the structure of heating device in the invention.

On the basis of embodiment 1, in order to ensure that the heating device 2 can fully distill the seawater, as shown in FIG. 2, the heating device 2 comprises heating box 201 and multiple graphene heat-conduction layers 202 arranged in the middle of the heating box 201, multiple heating pipelines 203 are arranged between the multiple graphene heat-conduction layers 202, one end of the heating pipelines 203 is connected to the heating inlet 209, and the other end is connected to the heating outlet 210, the top of the heating box 201 is provided with a spraying pipeline 204, multiple spraying heads 205 are provided on the spraying pipeline 204, the spraying pipeline 204 is connected to the seawater adding pipeline 11 through a seawater inlet pipeline 207.

The top of the heating box 201 is provided with a curved vapor collecting plate 206, the top of the curved vapor collecting plate 206 is provided with a vapor outlet pipeline 208 connected to the vapor connection pipeline 8.

The seawater after heat exchange is sprayed into the heating box 201 through the spraying heads 205, which can ensure that the seawater enters into the heating box 201 for fully heating, the sprayed seawater falls on the graphene heat-conduction layers 202 to filter, the seawater is also heated by the heating pipelines when filtering, water vapor formed after heating is collected by the curved vapor collecting plate 206 and then enters into the fresh water condensation heat-exchange device 3 for heat exchange, the distilled concentrated seawater enters into the bottom of the heating box 201 by passing through the graphene heat-conduction layers 202, and enters into the thermal-expansion and cold-shrinkage control valve mechanism 4 to control the flow of the seawater entering into the heating device, when the graphene heat-conduction layers 202 is multi-layered, heating pipelines are provided between each layer to ensure that the falling seawater can be fully heated and distilled, and simultaneously, it can prevent the graphene heat-conduction layers 202 from being blocked by the heated concentrated seawater.

Embodiment 4

Figure 3:
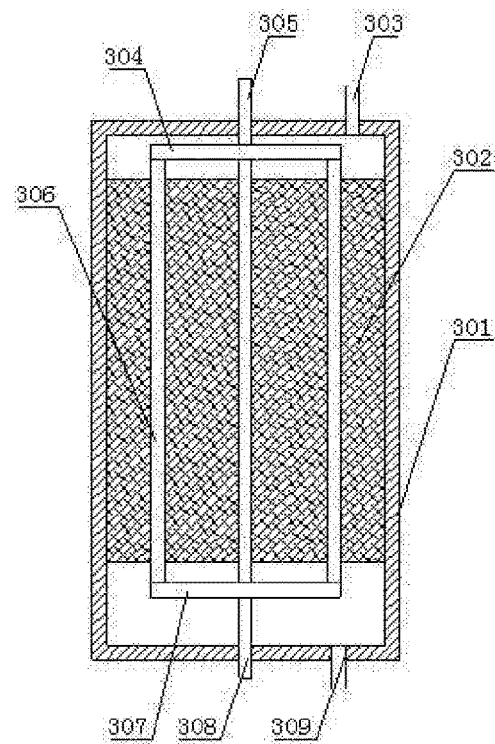
FIG. 3 shows the structure of fresh water condensation heat-exchange device in the invention.

On the basis of embodiment 1, in order to ensure that the fresh water condensation heat-exchange device 3 can fully cool and exchange heat of water vapor, and can pre-treat the incoming seawater to avoid damage to subsequent equipment, as shown in FIG. 3, the fresh water condensation heat-exchange device 3 comprises heat-exchange box 301, heat-exchange filter screen 302 is arranged in the heat-exchange box 301, and multiple heat-exchange conduits 306 are inserted into the heat-exchange filter screen 302, upper and lower ends of the multiple heat-exchange conduits 306 are respectively connected to upper distribution annular pipeline 304 and lower distribution annular pipeline 307 of the heat-exchange box 301, the upper distribution annular pipeline 304 is connected to the fresh water inlet 305, and lower distribution annular pipeline 307 is connected to the fresh water outlet 308;

the seawater inlet 303 and the seawater outlet 309 are respectively connected with the inside of the heat-exchange box 301.

The incoming seawater enters into the heat-exchange box through the seawater inlet 303 to be filtered by the heat-exchange filter screen 302, and exchanges heat with the water vapor entering into the heat-exchange conduits 306 in the same time, thereby achieving the dual purpose of heat exchange and pretreatment, the heat-exchange filter screen can be a filter screen made of a thermally conductive material, multiple heat-exchange conduits 306 are adopted to increase heat exchange area and improve the heat exchange efficiency.

Specifically, the water vapor is distributed into the heat-exchange conduits 306 through the upper distribution annular pipeline 304, and uniformly enters into the lower distribution annular pipeline 307 after cooling, and then is led out into the fresh water collecting tank through the fresh water outlet 308, the seawater enters into the heat-exchange box 301 for filtering and heat exchange, then enters into the seawater outlet 309, and enters into the heating device by the control of the thermal-expansion and cold-shrinkage control valve mechanism 4.

The above embodiments are only examples of the invention, and the protection scope of the invention is not limited thereto, any design identical or similar to the invention should be included within the protection scope of the invention.

The invention claimed is:

1. A desalination device with graphene filtering for the production of drinking water, comprising heating device, solar heat-collecting device, fresh water condensation heat-exchange device and thermal-expansion and cold-shrinkage control valve mechanism;

heat-conduction fluid outlet on the solar heat-collecting device and heating inlet on the heating device are connected through heat-conduction fluid introduction pipeline, heat-conduction fluid inlet on the solar heat-collecting device and heating outlet are connected through heat-conduction fluid discharge pipeline;

the top of the heating device and fresh water inlet on the fresh water condensation heat-exchange device are connected through a vapor connection pipeline, and fresh water outlet on the fresh water condensation heat-exchange device and fresh water collecting tank are connected through a fresh water collecting pipeline;

seawater inlet on upper end of the fresh water condensation heat-exchange device is connected to a seawater introduction pipeline, seawater outlet on lower end of the fresh water condensation heat-exchange device is connected to the thermal-expansion and cold-shrinkage control valve mechanism through a seawater control pipeline, and the thermal-expansion and cold-shrinkage control valve mechanism and the heating device are connected through seawater adding pipeline;

the heating device and the thermal-expansion and cold-shrinkage control valve mechanism are connected through concentrated seawater discharge pipeline, after passing through the thermal-expansion and cold-shrinkage control valve mechanism, concentrated seawater enters into a concentrated seawater collecting tank through concentrated seawater collecting pipeline;

water vapor heated by the heating device enters into the fresh water condensation heat-exchange device to exchange heat with the seawater entering into the fresh water condensation heat-exchange device, in the heat-exchange device the vapor is introduced into a condenser which produces fresh water, the concentrated seawater is introduced into the collecting tank via the thermal expansion and cold shrinkage control valve with an increased temperature which opens and closes the thermal expansion and cold shrinkage valve, thereby increasing the flow of seawater into the heating device; conversely when the temperature of the concentrated seawater is decreased the flow of the seawater decreases the flow into the heat exchange device.

2. The desalination device with graphene filtering for the production of drinking water of claim 1, wherein the thermal-expansion and cold-shrinkage control valve mechanism comprises a valve body, a fluid outlet arranged on one side of the valve body and connected to the seawater adding pipeline, the valve body is provided with an inner sleeve slidably connected to inner wall of the valve body, and an internal outlet connected to the fluid outlet is provided on side wall of the inner sleeve;

an expansion balloon is arranged on bottom of the valve body, thermal-expansion and cold-shrinkage liquid is provided in the expansion balloon, a heat-conduction pipeline is provided in the thermal-expansion and cold-shrinkage liquid, one end of the heat-conduction pipeline is connected to the concentrated seawater discharge pipeline, the other end thereof is connected to the concentrated seawater collecting pipeline; upper end of the expansion balloon is fixedly connected to bottom of the inner sleeve, and lower end of the expansion balloon is fixedly connected to bottom of the valve body;

when the temperature of the concentrated seawater after passing through the heating device is too high, the concentrated seawater enters into the heat-conduction pipeline through the concentrated seawater discharge pipeline to heat the thermal-expansion and cold-shrinkage liquid in the expansion balloon, after the thermal-expansion and cold-shrinkage liquid in the expansion balloon is heated, the expansion balloon expands and drives the inner sleeve to move up in the valve body, the overlapping area of the internal outlet on the inner sleeve and the fluid outlet (402) on the valve body increases, the opening and closing of the fluid outlet on the valve body increases, and the flow of seawater entering into the heating device increases;

when the temperature of the concentrated seawater after passing through the heating device is too low, the temperature of the thermal-expansion and cold-shrinkage liquid in the expansion balloon becomes lower, and the thermal-expansion and cold-shrinkage liquid shrinks, the volume of the expansion balloon decreases, and the inner sleeve moves downward, the overlapping area of the internal outlet on the inner sleeve and the fluid outlet on the valve body decreases, the opening and closing of the fluid outlet on the valve body decreases, and the flow of seawater entering into the heating device decreases.

3. The desalination device with graphene filtering for the production of drinking water of claim 2, wherein the bottom of the valve body is provided with a support plate, two sides of the support plate are provided with sliding blocks, the sliding blocks provided on both sides are movably connected to sliding paths provided on both sides of the valve body, the support plate and the bottom of the inner sleeve are fixedly connected by a connecting rod, and the top of the expansion balloon and the support plate are fixedly connected.

4. The desalination device with graphene filtering for the production of drinking water of claim 1, wherein the solar heat-collecting device comprises a heat collection support, one end of the heat collection support is provided with an inclined convex lens, and the heat collection support is provided with an inclined heat collection plate, a heat-conduction fluid chamber is formed between the heat collection plate and the heat collection support, and the heat-conduction fluid outlet and the heat-conduction fluid inlet are connected to the heat-conduction fluid chamber.

5. The desalination device with graphene filtering for the production of drinking water of claim 4, wherein the center line of the inclined convex lens is parallel to the heat collection plate.

6. The desalination device with graphene filtering for the production of drinking water of claim 1, wherein the heating device comprises heating box and multiple graphene heat-conduction layers arranged in the middle of the heating box, multiple heating pipelines are arranged between the multiple graphene heat-conduction layers, one end of the heating pipelines is connected to the heating inlet, and the other end is connected to the heating outlet, the top of the heating box is provided with a spraying pipeline, multiple spraying heads are provided on the spraying pipeline, the spraying pipeline is connected to the seawater adding pipeline through a seawater inlet pipeline.

7. The desalination device with graphene filtering for the production of drinking water of claim 1, wherein the heating box comprises a curved vapor collecting plate which further includes a vapor outlet is operative connection to the vapor connection pipeline.

8. The desalination device with graphene filtering for the production of drinking water of claim 1, wherein the fresh water condensation heat-exchange device comprises heat-exchange box, heat-exchange filter screen is arranged in the heat-exchange box, and multiple heat-exchange conduits are inserted into the heat-exchange filter screen, upper and lower ends of the multiple heat-exchange conduits are respectively connected to upper distribution annular pipeline and lower distribution annular pipeline of the heat-exchange box, the upper distribution annular pipeline is connected to the fresh water inlet, and lower distribution annular pipeline is connected to the fresh water outlet; the seawater inlet and the seawater outlet are respectively connected to the inside of the heat-exchange box.

* * * * *